March 7, 1944.  F. E. FLADER ET AL  2,343,655
COWLING
Filed Aug. 22, 1941

INVENTORS
FREDRIC E. FLADER AND
BY DONOVAN R. BERLIN
ATTORNEY

Patented Mar. 7, 1944

2,343,655

UNITED STATES PATENT OFFICE 2,343,655

COWLING

Fredric E. Flader, Kenmore, and Donovan R. Berlin, Eggertsville, N. Y., assignors to Curtiss-Wright Corporation, a corporation of Delaware Application August 22, 1941, Serial No. 407,895

3 Claims. (Cl. 244—130)

This invention relates to aircraft and is particularly concerned with improvements in engine cowling for the purpose of increasing the efficiency of air flow over the exterior of the cowling.

A particular object of the invention is to provide improvements in aircraft engine cowling to afford relatively undisturbed air flow thereover particularly on aircraft having protuberances rearward of the cowling. A further object is to provide means in aircraft cowling, to assure uniform air flow over the top of the cowl when the cowl axis is inclined at a positive angle of incidence to the relative air flow. Another object is to provide an engine cowling system which shall suppress turbulent air flow thereover whereby control surfaces and the like, rearward of the cowling, will lie in a region of relatively smooth air flow. A further object is to provide means to bleed air from an annular engine cowling under low air speed, high angle of incidence conditions, and to suppress such air bleed under normal high speed flight conditions.

Further objects of the invention will become apparent in reading the annexed detailed description in connection with the drawing, in which.

Figure 1:
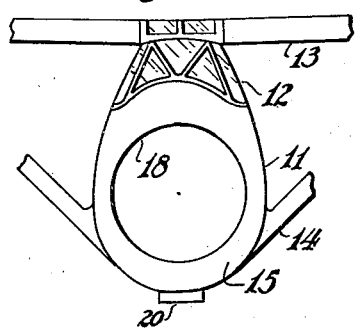
Figs. 1 and 2 are, respectively, front and side elevations of a portion of an aircraft not equipped with the invention, Fig. 2 showing the probable air flow conditions over the cowling.

Similar numbers refer to similar parts in the several views. For purposes of illustration, we have chosen to show a portion of a high wing braced monoplane comprising a fuselage 11 having a protuberant cabin portion 12 at the top thereof, a main wing 13 extending spanwise across the top of the cabin portion 12. Lift struts for the wing are shown at 14. At the front of the fuselage 11, an annular engine cowling 15 is shown as embracing an aircraft engine 16, the engine cylinders forming a partial dam to air flow through the cowling between the annular cooling air entrance 18 and the usual adjustable air exit opening 19 rearward of the engine. Such an opening 19 is provided with adjustable flaps 20 under pilot control by which the amount of cooling air flow through the cowling may be adjusted in different flight phases.

Figure 2:
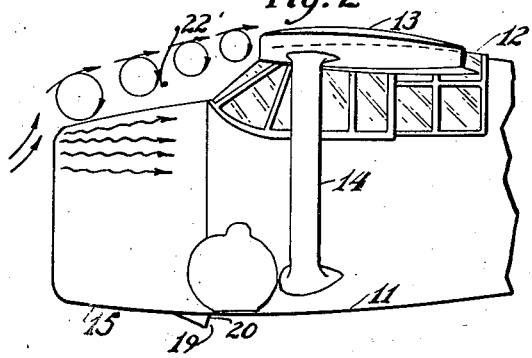
Figure 3:
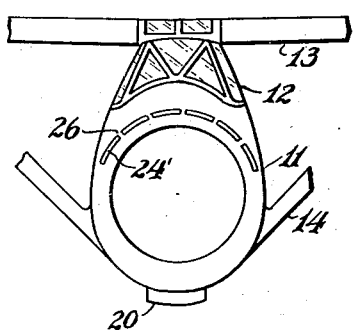
Figs. 3 and 4 are, respectively, front and side elevations of a portion of an aircraft equipped with the improvements of this invention and showing, in Fig. 4, the air flow conditions resulting from the use of the invention.

Referring to Fig. 2, it has been found that, when the aircraft is climbing at comparatively low air speed, a turbulent zone occurs at 22 probably due in part to the interference from the front of the cabin 12 and to the spillage of air from the top of the annular air entrance 18. Such turbulent air tends to spoil lift of the wing 13 at its center portion and may also carry back to the aircraft empennage to interfere with proper control operation of the rudder and elevators.

In order to overcome this difficulty, we have provided one or more segmental slits 24 across the top of the cowling 15, these slits being disposed a short distance rearwardly of the cowl leading edge and of the air entrance opening 18. Furthermore, these slits are disposed forward of the engine 16 so that air from the pressure cavity of the cowling, ahead of the engine, bleeds therethrough to establish smooth air flow over the top of the cowling, over the front of the cabin 12, and over the top of the wing center section. The slit 24 may, if desired, be continuous so that it embraces an arc of about 120° across the top of the cowling. For structural reasons, however, it may be desirable to utilize a plurality of short slits such as 24' spaced apart by bridge elements 26 which serve to provide a structurally integral cowl unit whereby the upper leading edge portion of the cowl is rigidly secured to the upper rearward portion of the cowl.

Figure 5:
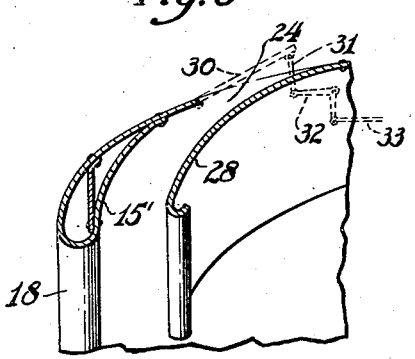
Fig. 5 is an enlarged fragmentary section of the cowling nose.
Figure 6:
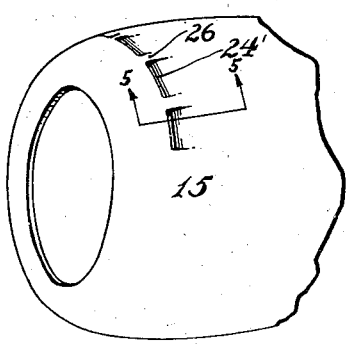
Fig. 6 is a perspective view of the front of the cowling incorporating the provisions of the invention.

Preferably, as shown in Fig. 5, the slits 24 are faired for smooth air flow therethrough by an auxiliary segmental member 28 rigid with the cowling 15, and the leading edge of the cowling 15, as is usual, includes reinforcement 15' to improve structural characteristics of the cowling and also to establish smooth air flow through the air entrance 18.

Figure 4:
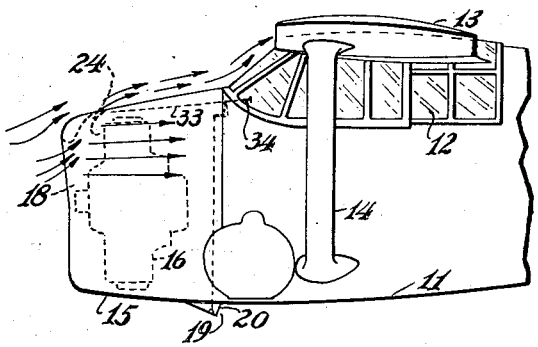

The difficulty of turbulence in the zone 22 as indicated in Fig. 2 occurs principally at high angle of incidence low air speed conditions and is not encountered during high speed level flight. Since the slit 24 bleeds a portion of the cooling air otherwise available to the engine to suppress turbulence as shown in Fig. 4, and since also it may have a tendency to increase aircraft drag, means such as flaps 30 may be provided at the slit 24 to close off the slit when the function of the slit is unnecessary. Means for operating the flaps 30 may comprise a link 31 pivoted to the flap and to a bellcrank 32 controllable by the pilot through a rod 33. This rod 33 may be a forward continuation of the rod 34 which serves to control the air exit opening flaps 20. In practice, the flaps 20 never entirely close the air exit opening 19 since cooling air flow through the cowling is always required when the engine is running. The slit flaps 24, however, may be closed entirely during high speed flight so the interconnecting linkage 33 between the flaps 30 and 20 may be arranged so that the flaps 30 are closed while the flaps 20 are partly open and so that the flaps 30 and 20 are opened simultaneously when air speed and angle of incidence conditions require additional cooling air flow for the engine which need arises simultaneously with the turbulent air condition over the top of the cowling which, as above pointed out, is suppressed by the use of slits 24.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft, an annular cowling enclosing the aircraft engine and having a trailing edge forming a substantially streamlined continuation of the profile of the adjacent portion of the aircraft body, a protuberance on said aircraft on one side of said cowling and rearward thereof, said cowling having an abruptly inturned leading edge portion defining an air entrance opening and having a circumferetially extending slot formed therein rearward of its leading edge, forwardly of said engine and substantially limited to the same side of said cowling as said protuberance, said slot permitting outflow therethrough of a portion of the air entering said opening and being shaped to direct said outflowing air over the outer surface of said cowling in front of said protuberance, and an air exit opening rearward of said engine.

2. In a aircraft, an annular cowling enclosing the aircraft engine and having an abruptly inturned leading edge portion defining an air entrance opening, the trailing edge of said cowling having a periphery corresponding to the periphery of the adjacent portion of the aircraft body to form a substantially streamlined continuation thereof, a protuberance on said aircraft rearward of said cooling, said cowling having circumferentially extending slot means formed therein rearward of its leading edge, forwardly of said engine and substantially limited to the same side of said cowling as said protuberance, said slot means consisting of a plurality of individual circumferentially spaced slots, each said slot permitting outflow therethrough of a portion of the air entering said opening and being shaped to direct said outflowing air over the outer surface of said cowling in front of said protuberance, and an air exit opening rearward of said engine.

3. In an aircraft, an annular cowling enclosing the aircraft engine and having a trailing edge forming a substantially streamlined continuation of the profile of the adjacent portion of the aircraft body, a protuberance on said aircraft on one side of said cowling and rearward thereof, said cowling having an abruptly inturned leading edge portion defining an air entrance opening and having a circumferentially extending slot formed therein rearward of its leading edge, forwardly of said engine and substantially limited to the same side of said cowling as said protuberance, said slot permitting outflow therethrough of a portion of the air entering said opening and being shaped to direct said outflowing air over the outer surface of said cowling in front of said protuberance, an air exit opening rearward of said engine, means for adjusting the effective area of said air exit opening, means for adjusting the effective area of said slot, and a unitary member operative to adjust both said last named means.

FREDRIC E. FLADER.
DONOVAN R. BERLIN.